(12) United States Patent
Yoshimi

(10) Patent No.: US 6,716,934 B2
(45) Date of Patent: Apr. 6, 2004

(54) METHOD FOR PRODUCING ETHYLENE-VINYL ACETATE COPOLYMER, SAPONIFIED PRODUCT OF COPOLYMER PREPARED BY THE METHOD, AND MOLDED PRODUCT CONTAINING THE SAME

(75) Inventor: Kazuyori Yoshimi, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/978,099

(22) Filed: Oct. 17, 2001

(65) Prior Publication Data

US 2002/0068806 A1 Jun. 6, 2002

(30) Foreign Application Priority Data

Oct. 18, 2000 (JP) .......................... 2000-317361

(51) Int. Cl.[7] .................................. C08F 2/06
(52) U.S. Cl. .............................. 526/62; 526/65; 526/67; 526/71; 526/87; 526/219.6; 526/331; 422/138
(58) Field of Search ............... 526/62, 63, 64, 526/71, 87, 219.6, 227, 331, 319; 422/138

(56) References Cited

U.S. PATENT DOCUMENTS

| 3,510,464 | A | | 5/1970 | Sato |
| 4,649,186 | A | | 3/1987 | Jenkins et al. |
| 4,657,994 | A | * | 4/1987 | Tanaka et al. ............... 526/68 |
| 4,746,700 | A | | 5/1988 | Takida |
| 4,904,723 | A | | 2/1990 | Uemura et al. |
| 5,576,401 | A | | 11/1996 | Steiger et al. |
| 5,744,547 | A | * | 4/1998 | Moritani et al. .............. 525/62 |
| 6,238,606 | B1 | * | 5/2001 | Kunieda et al. ............. 264/143 |

FOREIGN PATENT DOCUMENTS

| EP | 917811 | 2/1963 |
| EP | 0 632 067 | 11/1996 |
| JP | 29-420 | 1/1954 |
| JP | 71014649 | * 5/1967 |
| JP | 49-134763 | 12/1974 |
| JP | 60-53513 | 3/1985 |
| JP | 61-197603 | 9/1986 |
| JP | 61-197604 | 9/1986 |
| JP | 62-143954 | 6/1987 |
| JP | 1-135852 | 5/1989 |
| JP | 9-71620 | 3/1997 |

* cited by examiner

Primary Examiner—Peter D. Mulcahy
Assistant Examiner—Satya Sastri
(74) Attorney, Agent, or Firm—Oblon, Spivak, McClelland, Maier & Neustadt, P.C.

(57) ABSTRACT

The present invention provides a method for producing an ethylene-vinyl acetate copolymer (EVA) containing 5 mol % to 60 mol % of ethylene, by copolymerizing ethylene and vinyl acetate with a polymerization initiator, in which an aliphatic alcohol having not more than four carbon atoms is used as the polymerization solvent, the contents of acetaldehyde and a saturated acetic ester with respect to vinyl acetate are not more than 200 ppm, and 10 ppm to 1500 ppm, respectively, and polymerization is carried out at a temperature of 30° C. to 150° C. EVA obtained by the foregoing method may be saponified to obtain a saponified ethylene-vinyl acetate copolymer (EVOH). According to the present invention, at least one of (i) improved melt-extrusion stability, (ii) improved melt-moldability, (iii) reduced discoloration, and (iv) reduced gelation is achieved.

15 Claims, No Drawings

METHOD FOR PRODUCING ETHYLENE-VINYL ACETATE COPOLYMER, SAPONIFIED PRODUCT OF COPOLYMER PREPARED BY THE METHOD, AND MOLDED PRODUCT CONTAINING THE SAME

BACKGROUND OF THE INVENTION

1. Field of the Invention

The present invention relates to a method for producing an ethylene-vinyl acetate copolymer (EVA), which product provides a saponified ethylene-vinyl acetate copolymer (EVOH) having excellent melt-extrusion stability and melt-moldability and that undergoes very little discoloration or gelation.

2. Related Background Art

Conventionally, EVOH has been produced industrially by preparing EVA by copolymerizing ethylene and vinyl acetate using a polymerization initiator and saponifying the EVA. When produced using conventional methods, however, load fluctuation tends to occur when EVOH is supplied to an extruder and subjected to melt extrusion, thereby not necessarily providing sufficient melt-extrusion stability. Drawdown and neck-in fluctuations tend to occur when EVOH is subjected to melt extrusion, so reducing melt-moldability as well. Furthermore, when produced by conventional methods, molded EVOH tends to undergo discoloration and gelation.

To solve the foregoing problems, various methods have been proposed, for instance, in JP49(1964)-134763A, JP62(1987)-143954A, and JP1(1989)-135852A. However, considering the levels of performance that recent molding materials must provide, further improvements are required.

SUMMARY OF THE INVENTION

Specifically, it is desirable to achieve at least one of the following properties: (i) improved melt-extrusion stability, (ii) improved melt-moldability, (iii) reduced discoloration, and (iv) reduced gelation, in comparison with EVOH that is obtained by saponifying EVA produced in accordance with conventional methods.

Viewed from one aspect, the invention thus provides a method for producing an ethylene-vinyl acetate copolymer containing from 5 mole percent (mol %) to 60 mol % ethylene, said method comprising adding a vinyl acetate-containing material, ethylene, a polymerization initiator, a polymerization solvent comprising an aliphatic alcohol having not more than four carbon atoms and a saturated acetic ester to a polymerization vessel and copolymerizing said vinyl acetate and said ethylene at a temperature of from 30° C. to 150° C., wherein the concentration of acetaldehyde added to the polymerization vessel is not more than 200 ppm with respect to the vinyl acetate and the concentration of said saturated acetic ester added to the polymerization vessel is from 10 ppm to 1500 ppm with respect to the vinyl acetate.

According to the present invention, an ethylene-vinyl acetate copolymer containing 5 mol % to 60 mol % of ethylene is produced by copolymerizing ethylene with vinyl acetate in a polymerization solvent. The copolymerization utilizes a polymerization initiator. Herein, an aliphatic alcohol having not more than four carbon atoms is used as the polymerization solvent. In a vinyl acetate-containing material for supplying the vinyl acetate, a content of acetaldehyde with respect to vinyl acetate is preferably not more than 200 ppm, and a content of saturated acetic ester with respect to vinyl acetate is 10 ppm to 1500 ppm. It should be noted, however, that the source of the trace component such as saturated acetic ester is not limited to vinyl acetate. Preferably, the present invention achieves at least one of the foregoing (i), (ii), (iii), and (iv), optimally all of (i) to (iv).

Viewed from a further aspect, the present invention provides EVOH obtained by saponifying EVA obtained by the method herein described. Molded products containing the EVOH are also considered to form a part of the invention.

DETAILED DESCRIPTION OF THE INVENTION

The following description will depict a preferred embodiment of the present invention.

In the present invention, an ethylene content in EVA is 5 mol % to 60 mol %. The ethylene content in EVA is preferably not less than 7 mol %, more preferably not less than 10 mol %, and particularly preferably not less than 20 mol %. Further, it is preferably not more than 58 mol %, more preferably not more than 55 mol %, and further preferably not more than 53 mol %. In the case where the ethylene content is lower than 5 mol %, the effect of reducing discoloration and gelation of EVOH obtained by saponification of the resulting EVA decreases. In the case where the ethylene content exceeds 60 mol %, the melt-moldability of EVOH obtained by saponification is impaired.

In the present invention, an aliphatic alcohol having not more than four carbon atoms is used as a polymerization solvent. If an aliphatic alcohol having five or more carbon atoms or an aromatic alcohol is used, the desired effects of the invention are reduced. Examples of aliphatic alcohols with not more than four carbon atoms include methanol, ethanol, propanol, and butanol. To achieve the effects of the present invention to a satisfactory extent, an aliphatic alcohol with not more than three carbon atoms is preferable, and an aliphatic alcohol with one carbon atom, that is, methanol, is more preferable.

Acetaldehyde is present as an impurity in the vinyl acetate that is supplied to the polymerization reaction. In the present invention, in the vinyl acetate-containing material, the content of acetaldehyde with respect to vinyl acetate is set to be not more than 200 ppm. The content of acetaldehyde is preferably not more than 150 ppm, more preferably not more than 100 ppm, and further preferably not more than 50 ppm. If the content of acetaldehyde with respect to vinyl acetate exceeds 200 ppm, the melt-extrusion stability and the melt-moldability of the obtained EVOH are impaired, and significant discoloration and gelation occur when molded products are produced with the obtained EVOH. It should be noted that vinyl acetate itself or a solution containing vinyl acetate may be used as the vinyl acetate-containing material. As the vinyl acetate-containing solution, an aliphatic alcohol solution in which the alcohol has not more than four carbon atoms is preferable. An alcohol solution of the same type as the polymerization solvent, particularly a methanol solution, is more preferable.

The mechanisms causing adverse effects due to the presence of acetaldehyde have not yet been proved. At the present time, it is considered that acetaldehyde functions as a chain transfer agent during polymerization, and affects the degree of polymerization, molecular weight distribution, branching, etc. of the EVA obtained by copolymerization, thereby adversely affecting the melt-extrusion stability and the melt-moldability of the EVOH. The discoloration and the gelation are considered to stem from condensation of acetaldehyde during polymerization of ethylene and vinyl acetate. The condensation product of acetaldehyde tends to cause discoloration and gelation and cannot be removed even in a later polymer-purifying process.

Recently, it was discovered that an excellent effect was achieved by reducing the content of acetaldehyde present as impurities in the vinyl acetate when ethylene and vinyl acetate were polymerized. Acetaldehyde was reduced by high precision distillation or with an ion-exchange resin. This, however, did not suffice to sufficiently improve the desired properties of the saponified product mentioned above. The inventor of the present invention further studied and consequently discovered that a conventional polymerizing system inherently tends to produce acetaldehyde.

It is deemed that vinyl acetate causes transesterification with a lower aliphatic alcohol that is used as a polymerization solvent, thereby producing acetaldehyde and an acetic ester as expressed by a reaction formula 1 below:

[Formula 1]

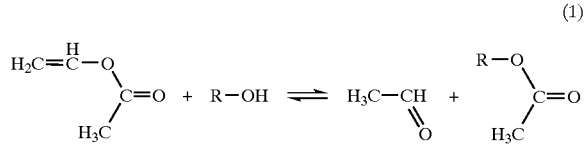

(1)

where R represents a lower alkyl group.

In other words, it is presumed that even if acetaldehyde in vinyl acetate is reduced before polymerization, a certain amount of heat could cause the foregoing transesterification, which produces acetaldehyde anew. Since this reaction is an equilibrium reaction, the addition of an acetic ester or the removal of lower aliphatic alcohol serves to prevent the production of acetaldehyde to some extent.

The inventor of the present invention studied both of these possibilities, and discovered that the latter was inappropriate since it rather tended to cause an increase in the occurrence of gelation and discoloration of the resulting EVOH, while the former required specific conditions as herein described.

In the present invention, the problems resulting from the presence of acetaldehyde during polymerization are addressed by the use of a saturated acetic ester. "Saturated acetic ester" refers to an ester obtained from acetic acid and a saturated aliphatic alcohol. If an ester other than a saturated acetic ester, for instance, an unsaturated acetic ester or an ester of an acid other than acetic acid is used, the desired effects of the present invention are reduced, and in some cases the polymerization is adversely affected. Preferred examples of the saturated acetic esters include an ester obtained from acetic acid and an aliphatic alcohol having not more than four carbon atoms, and more preferred examples of the same include methyl acetate and ethyl acetate. In a further preferable embodiment, a saturated acetic ester is selected to correspond to the alcohol used as polymerization solvent. For instance, in the case where methanol is used as the polymerization solvent, methyl acetate is recommended as the saturated acetic ester. Likewise, in the case where ethanol is used as the polymerization solvent, ethyl acetate is recommended as the saturated acetic ester. As indicated by these examples, as the combination of the polymerization solvent and the saturated acetic ester, a solvent containing methanol and/or ethanol is preferably used as the polymerization solvent, and an acetic ester of the alcohol contained in the polymerization solvent, specifically, methyl acetate and/or ethyl acetate, is preferably used as the saturated acetic ester.

The saturated acetic ester is preferably introduced into a polymerization vessel along with the vinyl acetate-containing material.

In the present invention, in a material for the supply of vinyl acetate, the content of a saturated acetic ester with respect to vinyl acetate is set to be 10 ppm to 1500 ppm. The content of saturated acetic ester preferably is not more than 1300 ppm, more preferably not more than 1200 ppm, and further preferably not more than 1000 ppm, as well as preferably not less than 30 ppm, more preferably not less than 50 ppm, and further preferably not less than 100 ppm. In the present invention, a plurality of saturated acetic esters may be used as a mixture. In this case, "the content of a saturated acetic ester" refers to the sum of respective contents of the saturated acetic esters.

From the viewpoint of suppression of production of acetaldehyde, it appears from the equilibrium reaction expressed by the reaction formula 1 that the content of a saturated acetic ester should preferably be as high as possible, but actually, in the case where the content of a saturated acetic ester with respect to vinyl acetate exceeds 1500 ppm, another drawback in the impairment of the melt-moldability of EVOH arises. In the case where the content of a saturated acetic ester is lower than 10 ppm, the improvements in melt-extrusion stability and the melt-moldability of the EVOH are reduced, as is the suppression of discoloration and gelation.

In the present invention, with a view to achieving sufficient effects, a content E (ppm) of a saturated acetic ester with respect to vinyl acetate and a content A (ppm) of acetaldehyde with respect to vinyl acetate preferably satisfy E>A, more preferably E>3A, further preferably E>5A, and most preferably E>10A. A vinyl acetate-containing material prepared beforehand so as to satisfy the foregoing relationship is preferably used.

In the present invention, polymerization is carried out at a temperature of 30° C. to 150° C. The polymerization temperature preferably is not lower than 35° C., more preferably not lower than 40° C., and further preferably not lower than 45° C., as well as preferably not higher than 120° C., more preferably not higher than 100° C., and further preferably not higher than 95° C. In the case where the polymerization temperature is above 150° C., the effects of the present invention are impaired, while in the case where the polymerization temperature is lower than 30° C., the melt-extrusion stability and the melt-moldability are impaired and the gelation tends to occur easily.

In the present invention, ethylene, vinyl acetate, a polymerization initiator, and an aliphatic alcohol having not more than four carbon atoms may be supplied continuously to a polymerization vessel, and EVA may be taken out continuously from the polymerization vessel. In this case, the present invention preferably includes the following steps (A) to (C):

(A) introducing the vinyl acetate-containing material, e.g., vinyl acetate or a vinyl acetate-containing alcohol solution, into a heat exchanger equipped with a cooling means, and introducing ethylene from the polymerization vessel into the heat exchanger, so as to cause the vinyl acetate-containing material to absorb at least a part of the ethylene in the heat exchanger;

(B) introducing the vinyl acetate-containing material that has absorbed ethylene into the polymerization vessel so as to mix with a polymerization solution that includes ethylene, vinyl acetate, a polymerization solvent and a polymerization initiator; and (C) introducing vaporized ethylene in excess of the ethylene solubility of the polymerization solution into the heat exchanger.

These steps are executable referring to, for instance, the method disclosed by JP60(1985)-53513A. In the case where a method includes the foregoing steps (A) to (C), heat (polymerization heat) generated in the polymerization vessel as ethylene is vaporized is removed effectively, and therefore, any temperature rise that may occur locally in the polymerization vessel is suppressed. At the polymerization temperatures, the reaction expressed by the reaction formula 1 tends to easily proceed as the temperature rises. Therefore, by preventing any localized increase in temperature in the polymerization vessel, the reaction that generates acetaldehyde is suppressed. Consequently, the melt-moldability and the melt-extrusion stability are improved, while discoloration and gelation are reduced further.

In such a continuous production method, all of the vinyl acetate is preferably introduced into the polymerization vessel through the heat exchanger, but according to the amount of heat generated by the polymerization, part of the vinyl acetate may be passed through the heat exchanger while the rest may be introduced directly into the polymerization vessel.

In the present invention, in the foregoing continuous polymerization method, a temperature $T_1$ (° C.) of vinyl acetate or a vinyl acetate-containing solution that has absorbed ethylene and is introduced into the polymerization vessel and a temperature $T_2$ (° C.) of a polymerization solution in the polymerization vessel preferably satisfy the relationship $T_1<T_2$. The two temperatures more preferably satisfy the relationship $T_1<T_2-10$, and further preferably satisfy the relationship $-15<T_1<T_2-20$.

By causing vinyl acetate or a vinyl acetate-containing solution to pass in a thin layer form through a wetted-wall multi-tubular heat exchanger, it is possible to enhance the efficiency of absorption of ethylene. As a method for contacting vinyl acetate or a vinyl acetate-containing solution with ethylene, any one of the counter-flow contact method and the parallel-flow contact method may be used, but the counter-flow contact method is preferable to fully obtain the effects of the present invention.

As the polymerization initiator, at least one compound selected from a diacylperoxide-based initiator, a valeronitrile-based initiator, and a peroxydicarbonate-based initiator is preferably used. By using such a polymerization initiator, the melt-extrusion stability and the melt-moldability can be further improved. The discoloration and the gelation can also be reduced.

Examples of the diacylperoxide-based polymerization initiator include acetyl peroxide, dipropyl peroxide, isobutynyl peroxide, benzoyl peroxide, dilauroyl peroxide, etc. Examples of the valeronitrile-based polymerization initiator include 2,2'-azobis(2,4,4'-trimethyl valeronitrile), 2,2'-azobis(2,4-dimethyl valeronitrile), 2,2'-azobis(4-methoxy-2,4-dimethyl valeronitrile), 2,2'-azobis(4-ethoxy-2,4-diethyl valeronitrile), 2,2'-azobis(4,4'-diethoxy-2-methyl valeronitrile), etc. Examples of the peroxydicarbonate-based polymerization initiator include dicyclohexyl peroxydicarbonate, bis(4-t-butylcyclohexyl) peroxydicarbonate, di-n-propyl peroxydicarbonate, etc. Among these, acetyl peroxide, 2,2'-azobis(4-methoxy-2,4-dimethyl valeronitrile), di-n-propyl peroxydicarbonate, and dicyclohexyl peroxydicarbonate are preferred for use in the present invention. Further, 2,2'-azobis(4-methoxy-2,4-dimethyl valeronitrile) is more preferable.

In the present invention, by adding a conjugated double bond-containing compound that has a molecular weight of not more than 1000 to the solution after the polymerization of EVA, more pronounced effects of the present invention may be obtained. More specifically, a compound having a structure in which at least two carbon-carbon double bonds are linked via one carbon-carbon single bond may be used, which is disclosed in JP61(1986)-197603A, JP61(1986)-197604A, JP9(1997)-71620A, etc. Examples of this compound include conjugated diene compounds having a structure in which two carbon-carbon double bonds and one carbon-carbon single bond are linked alternately, conjugated triene compounds having a structure in which three carbon-carbon double bonds and two carbon-carbon single bonds are linked alternately, and conjugated polyene compounds having a structure in which more than three carbon-carbon double bonds and more than two carbon-carbon signal bonds are linked alternately. Therefore, herein a conjugated triene compound such as 2,4,6-octatriene is categorized in those referred to as compounds having a conjugated double bond. Furthermore, a plurality of sets of conjugated double bonds may exist independently in one molecule. For instance, a compound having three conjugated trienes in one molecule, such as tung oil, is categorized in those referred to herein as compounds having a conjugated double bond.

The compound having a conjugated double bond may include various other functional groups, for instance, a carboxyl group or a salt of the same, a hydroxy group, an ester group, a carbonyl group, an ether group, an amino group, an imino group, an amide group, a cyano group, a diazo group, a nitro group, a sulfone group, a sulfoxide group, a sulfide group, a thiol group, a sulfonic acid group or a salt of the same, a phosphoric acid group or a salt of the same, a phenyl group, a halogen atom, a double bond, or a triple bond. Such a functional group may be bonded directly to a carbon atom in the conjugated double bond, or may be bonded at a position separated from the conjugated double bond. Therefore, a multiple bond in a functional group may be situated so as to be conjugatable with the conjugated double bond. For instance, 1-phenyl-1,3-butadiene having a phenyl group, sorbic acid having a carboxyl group, and myrcene having an olefinic double bond are categorized in those referred to herein as compounds having a conjugated double bond. Furthermore, the conjugated double bond herein described is not limited to the conjugated double bond between aliphatics as described above, but it also includes a conjugated double bond between an aliphatic and an aromatic, as seen in, for instance, 2,4-diphenyl-4-methyl-1-pentene, and 1,3-diphenyl-1-butene.

Among these, a compound having a conjugated double bond between aliphatics, or a compound that has a polar group such as a carboxyl group or a salt of the same, a hydroxyl group, or the like, as well as a conjugated double bond, is preferable. A compound having a polar group as well as a conjugated double bond between aliphatics is more preferable.

A compound having a conjugated double bond for use in the invention preferably has a molecular weight of not more than 1000. If the molecular weight exceeds 1000, sufficient melt-extrusion stability and prevention of gelation cannot be obtained.

A compound having a conjugated double bond is preferably added so that a ratio of the compound with respect to EVOH obtained by saponifying the EVA obtained by polymerization is in a range of 0.1 ppm to 3000 ppm. The ratio is more preferably not less than 1 ppm, further preferably not less than 3 ppm, and most preferably not less than 5 ppm. Further, the ratio is more preferably not more than 2000 ppm, further preferably not more than 1500 ppm, and most preferably not more than 1000 ppm. Two or more kinds of compounds having a conjugated double bond may be used as a mixture. In this case, "an added amount of the compound" refers to a sum of respective added amounts.

The compound having a conjugated double bond is preferably added at a time after the polymerization process and before the step of removing vinyl acetate from the EVA polymerization solution, to fully obtain the effects of the present invention. The compound is considered to function as a kind of stabilizer for preventing deterioration of EVA.

In the present invention, it is possible to supply other polymerizable monomers during the polymerization process, so as to permit copolymerization of the same. Examples of polymerizable monomers used for copolymerization include: olefins such as propylene, n-butene, i-butene, 4-methyl-1-pentene, 1-hexene, and 1-octene; unsaturated carboxylic acids such as itaconic acid, methacrylic acid, acrylic acid, and maleic acid, salts of the same, partially or completely esterified products of the same, amides of the same, and anhydrides of the same; vinylsilane-based compounds such as vinyl trimethoxysilane; unsaturated sulfonic acid and salts of the same; alkyl thiols; and vinyl pyrrolidones. The added amount of the polymerizable monomers may be readily determined by those skilled in the art.

EVA obtained by the present invention can be saponified by a known saponification method using alkali, metal alkoxide, etc. so as to be transformed into EVOH. A degree of saponification of EVOH preferably is not less than 90%, more preferably not less than 95%, further preferably not less than 97%, and most preferably not less than 99%. In the case where the degree of saponification is lower than 90%, the melt-moldability and the melt-extrusion stability are likely to be impaired, and significant discoloration and gelation may occur.

The EVOH obtained by the present invention preferably contains a boron compound. This further improves the melt-extrusion stability and the melt-moldability of EVOH. Examples of such a boron compound include boronic acids, borate esters, borates, boron hydrides, etc. More specifically, boric acids are, for instance, orthoboric acid, methaboric acid, and tetraboric acid. Borate esters are, for instance, triethyl borate, and trymethyl borate. Borates are, for instance, alkali metal salts and alkaline earth metal salts of the foregoing boric acids, and borax. Among these compounds, orthoboric acid is preferable.

A content of the boron compound is preferably 20 ppm to 2000 ppm in terms of the element boron, and more preferably 50 ppm to 1000 ppm. By setting the boron content in this range, the melt-extrusion stability and the melt-moldability of the EVOH are further improved. If the content is less than 20 ppm, such an effect is limited, while if the content exceeds 2000 ppm, the gelation occurs rather easily, thereby possibly leading to poor molding.

With a view to improving the melt-extrusion stability and the melt-moldability, EVOH obtained by the present invention preferably has a melt flow rate (MFR) in a range of 0.1 gram per ten minutes (g/10 min) to 100 g/10 min, more preferably in a range of 0.2 g/10 min to 20 g/10 min, further preferably in a range of 0.3 g/10 min to 10 g/10 min, and most preferably in a range of 0.4 g/10 min to 8 g/10 min. Here, the MFR of EVOH is a value measured at 190° C. under a load of 2160 g, according to the Japanese Industrial Standard (JIS) K7210. In the case where EVOH has a melting point in the vicinity of or above 190° C., the MFR is a value obtained by extrapolating to 190° C. in a semilogarithmic graph with the reciprocal of absolute temperature as the horizontal axis and the MRF as the vertical axis (logarithm). In this case, measurement should be carried out at a plurality of temperatures higher than the melting point under a load of 2160 g.

Various kinds of additives may be added to EVOH obtained by the present invention, according to necessity. Examples of such additives include antioxidants, plasticizers, thermal stabilizers, ultraviolet absorbers, antistatic agents, lubricants, colorants, fillers, other thermoplastic resins, etc.

EVOH obtained by the present invention is moldable by a known molding method into various kinds of molded products. According to the present invention, excellent melt-molding properties such as drawdown resistance, neck-in fluctuation resistance, etc. are obtained in the case where EVOH alone is subjected to melt-molding. EVOH, however, exhibits further excellent melt-molding properties when coextruded with other thermoplastic resins. Examples of molded products include films, sheets, pipes, tubes, bottles, etc.

Examples of other thermoplastic resins that may be combined with EVOH obtained by the present invention for coextrusion include polyolefins, polyamides, polyesters, polystyrenes, etc. Examples of polyolefins include: low-density polyethylenes, linear low-density polyethylenes, very-low-density polyethylenes, middle-density polyethylenes, and high-density polyethylenes; polyethylenes obtained by copolymerization of vinyl acetate, (meth) acrylic ester, butene, hexene, and 4-methyl-1-pentene, etc.; ionomers; polypropylene homopolymer; polypropylenes obtained by copolymerization with olefins such as ethylene, butene, hexene, 4-methyl-1-pentene, etc.; polyl-butene; poly4-methyl-1-pentene; and carboxylic-acid-modified polyolefin based on the foregoing olefins. Particularly excellent melt-moldability is achieved in the case where EVOH is coextruded with carboxylic-acid-modified polyolefin, among these polyolefins.

The carboxylic-acid-modified polyolefin refers to a polyolefin having a carboxyl group in the molecule. The excellent effects obtained in the coextrusion of EVOH and a carboxylic-acid-modified polyolefin are presumed to be obtained by interaction between a hydroxy group of EVOH and a carboxyl group or its anhydride of the carboxylic-acid-modified polyolefin at an interface between an EVOH layer and a carboxylic-acid-modified polyolefin layer. Examples of the carboxylic-acid-modified polyolefin include a polyolefin grafted with an $\alpha,\beta$-unsaturated carboxylic acid or an anhydride of the same, a copolymer obtained by random copolymerization of an olefin monomer and an $\alpha,\beta$-unsaturated carboxylic acid or an anhydride of the same, etc. Examples of the $\alpha,\beta$-unsaturated carboxylic acid or the anhydride of the same include acrylic acid, methacrylic acid, maleic acid, itaconic acid, maleic anhydride, itaconic anhydride, etc. Among these, maleic acid and maleic anhydride are preferable. Further, in the carboxylic-acid-modified polyolefin, all or a part of the carboxyl groups may be present in a metal salt form, as exemplified by ionomer.

To fully obtain the effects of the present invention, $\alpha,\beta$-unsaturated carboxylic acid graft-modified polyethylene is preferably used, and particularly preferably, $\alpha,\beta$-unsaturated carboxylic acid graft-modified linear low-density polyethylene with a density of 0.88 g/cm$^3$ to 0.93 g/cm$^3$ and an MFR of 1.0 g/10 min to 7.0 g/10 min (190° C., 2160 g) is used. In this case, a content of $\alpha,\beta$-unsaturated carboxylic acid or an anhydride of the same preferably is 0.01 percent by weight (wt %) to 5 wt %, more preferably 0.03 wt % to 4 wt %, and further preferably 0.05 wt % to 3 wt %, with a view to achieving the effects of the present invention fully. Furthermore, it is possible to use 100% modified polyolefin, but it is advantageous from the viewpoint of costs to use a material obtained by blending polyolefin modified to have a higher concentration and non-modified polyolefin so that the blended material has a final content of modified polyolefin in the foregoing ranges.

Examples of polyamides that may be coextruded with EVOH obtained by the present invention include nylon-6, nylon-6/12, nylon-6/6,6, nylon-11, nylon-12, etc. Among these polyamides, copolymerized polyamide containing a caproamide component, particularly nylon-6/6,6 is preferable from the viewpoint of full achievement of the effects of the present invention.

Typical examples of polyesters include polyethylene terephthalate, polybutylene terephthalate, polyethylene (terephthalate/isophthalate), poly(ethylene/cyclohexanedimethylene) terephthalate, etc. Additionally, mention may be made to the foregoing polymers containing, as copolymerization components: diols including ethylene glycol, butylene glycol, cyclohexane dimethanol, neopentyl glycol, pentane diol, etc.; and dicarboxylic acids including isophthalic acid, benzophenone dicarboxylic acid, diphenylsulfone dicarboxylic acid, diphenylmethane dicarboxylic acid, propylene-bis(phenylcarboxylic acid), diphenyloxide dicarboxylic acid, oxalic acid, malonic acid, succinic acid, glutaric acid, adipic acid, pimelic acid, suberic acid, azelaic acid, sebacic acid, diethylsuccinic acid, etc.

Polystyrene is not limited to styrene polymer, but may include copolymers of polymerizable monomers other than styrene, and blended materials of resins obtained by polymerizing polymerizable monomers other than styrene. More specifically, examples of polystyrene include styrene homopolymer, high-impact polystyrene (HIPS) containing a slight amount of a rubber component, acrylonitrile-butadiene-styrene copolymer (ABS), acrylonitrile-styrene copolymer (AS), styrene-diene copolymer and hydrogenated products of the same, styrene-maleic anhydride copolymer, etc.

EVOH obtained by the present invention is moldable by melt-molding into various kinds of molded products such as films, sheets, pipes, tubes, and bottles. These molded products may be crushed and again molded. The films and sheets can be stretched uniaxially or biaxially to obtain oriented films and sheets, or it is useful to thermally molding the same to obtain containers such as trays and cups. As the melt-molding method, a known method such as extrusion molding using a T-die, inflation molding, blow molding, etc. may be used. With a view to fully achieving the effects of the present invention, the temperature for melt-molding is normally 150° C. to 300° C., preferably 165° C. to 280° C., and more preferably 170° C. to 250° C. Given a melting point of EVOH of Tm(° C.), it is recommended that the melt-molding temperature is in a range of Tm+10° C. to Tm+50° C.

EXAMPLES

The following description will depict the present invention in more detail while referring to examples, but the present invention is not limited to these examples at all. It should be noted that unless otherwise specified, the materials used include substantially no acetaldehyde or saturated acetic ester. The methods for analysis and evaluation of the present invention are as follows:
(1) Analysis Method
(1-1) Quantification of acetaldehyde and saturated acetic ester:
Quantification was carried out by gas chromatography as described in JIS K6724.

(1-2) Quantification of 2,4-diphenyl-4-methyl-1-pentene (DPMP) and sorbic acid:
Calibration curves were obtained beforehand using samples of DPMP and sorbic acid, and quantification was carried out by high-performance liquid chromatography.
(1-3) Quantification of boron compounds:
A sample of EVOH was put in a magnetic crucible and ashed in an electric furnace. The obtained ash was dissolved in 200 mL of a 0.01-N aqueous solution of nitric acid and quantified by atomic absorption spectrometry, and a content of the boron compounds was calculated as a value in terms of elemental boron.
(2) Evaluation Methods
(2-1) Film formation by extrusion:
Two extruders with bores of 55 mmφ (for EVOH) and 70 mmφ (for the other thermoplastic resins) were prepared, and five stainless-steel screens of 50 mesh, 100 mesh, 300 mesh, 100 mesh, and 50 mesh were provided in the stated order at a screw-head breaker plate section of each extruder. Using a film-forming coextruder having a selector-plug-equipped feed block and a T-die with a lip width of 750 mm, a single-layer melt EVOH or a multi-layer melt material of EVOH and another thermoplastic resin was formed on a 95 mmφ chromium-plated mirror-finished roll by extrusion. An air gap (the distance from the die lip to a point at which the melt resin was brought into contact with a first roll) was set to be 25 cm. It should be noted that the setting of the selector plug of the feed block was changed when the layer composition was changed.
(2-2) Melt-extrusion Stability:
During the film formation by the single-layer extrusion or the multi-layer coextrusion described in the above (2-1), melt-extrusion stability was evaluated based on fluctuations of a screw load applied to the extruder when 30 minutes had elapsed since the start of film formation. It should be noted that criteria used in the evaluation were as follows:

A: The screw load fluctuation amplitude was very small, approximately 4 amperes, which did not adversely affect the operation at all.
B: The screw load fluctuation amplitude was small, approximately 6 amperes to 7 amperes, which did not adversely affect the operation.
C: The screw load fluctuation amplitude was slightly greater, approximately 9 amperes to 10 amperes, which adversely affected the operation slightly.
D: The screw load fluctuation amplitude exceeded 10 amperes, which adversely affected the operation.

(2-3) Melt-moldability:
(2-3-1) Drawdown Resistance:
During the film formation by the single-layer extrusion or the multi-layer coextrusion described in the above (2-1), drawdown resistance was evaluated based on drawdown of the melt resin discharged from the die lip when 30 minutes had elapsed since the start of film formation. It should be noted that criteria used in the evaluation were as follows:

A: Substantially no drawdown was observed, and the operation was not affected at all.
B: Slight drawdown was observed, but it did not adversely affect the operation.
C: Drawdown was observed, and it adversely affected the operation slightly.

D: Significant drawdown was observed, and it adversely affected the operation.

6 (2-3-2) Neck-in Fluctuation Resistance:

During the film formation by the single-layer extrusion or the multi-layer coextrusion described in the above (2-1), neck-in fluctuation resistance was evaluated based on neck-in fluctuations of the melt resin discharged from the die lip that were observed on both sides of the die when 30 minutes had elapsed since the start of film formation. It should be noted that criteria used in the evaluation were as follows:

A: Substantially no neck-in fluctuation was observed, and the operation was not affected at all.
B: Slight neck-in fluctuation was observed, but it did not adversely affect the operation.
C: Neck-in fluctuation was observed, and it adversely affected the operation slightly.
D: Significant neck-in fluctuation was observed, and it adversely affected the operation.

(2-4) Discoloration:

During the film formation by the single-layer extrusion or the multi-layer coextrusion described in the above (2-1), taking up of the film around a paper pipe in a roll form was started when 30 minutes had elapsed since the star of film formation. Discoloration was evaluated based on the degree of yellowness of an edge of the roll. It should be noted that criteria used in the evaluation were as follows:

A: Substantially no discoloration was observed, and the product had sufficient marketability.
B: Extremely slight discoloration was observed, but it was insignificant and the product had marketability.
C: Discoloration was observed, and the product had less marketability.
D: Significant discoloration was observed, and the product had no marketability.

(2-5) Gelation:

A film was sampled from the roll produced in the above (2-4), and gelation was evaluated from the extent of gelation on the surface of the film. In the case of the film formed by the multi-layer coextrusion, a film was formed by substituting maleic anhydride graft-modified linear low-density polyethylene used as an adhesive layer with a non-modified linear low-density polyethylene having a lower degree of adhesion, and an EVOH layer was separated from the coextruded film, so that gelation occurring in the EVOH layer could be evaluated. It should be noted that criteria used in the evaluation were as follows:

A: Substantially no gelation was observed, and the product had sufficient marketability.
B: Extremely slight gelation was observed, but it was insignificant and the product had marketability.
C: Gelation was observed, and the product had less marketability.
D: Significant gelation was observed, and the product had no marketability.

Example 1

A polymerization vessel having a capacity of 750 L was used that was connected with an upright wetted-wall multi-tubular heat exchanger that had a heating area of 4 m$^2$ and was equipped with ten tubes. All vinyl acetate had a content of acetaldehyde of 10 ppm and a content of methyl acetate of 500 ppm and was supplied at a rate of 31 kg/hr through the heat exchanger into the foregoing polymerization vessel. Additionally, ethylene was introduced directly into the polymerization vessel at a rate of 6 kg/hr. As a polymerization initiator, 2,2'-azobis(4-methoxy-2,4-dimethyl valeronitrile) (AMV) was introduced directly into the polymerization vessel at a rate of 1/2000 the rate of vinyl acetate, that is, 15.5 g/hr. Methanol as a polymerization solvent was introduced directly into the polymerization vessel at a rate of 2.3 kg/hr. It should be noted that substantially no acetaldehyde or methyl acetate was contained in materials fed to the polymerization vessel except where stated. Therefore, in the polymerization solution, the content of acetaldehyde and the content of methyl acetate with respect to vinyl acetate supplied thereto were the same as the above values.

In the polymerization vessel, continuous polymerization of EVA was started under conditions of a polymerization temperature of 60° C. ($T_2$) and a polymerization pressure of 45 kg/cm$^2$. Outside the heat exchanger, a refrigerant (30 wt % methanol aqueous solution) at −2° C. was circulated at a rate of 1.8 m$^3$/hr. While flowing down in thin layer form through the heat exchanger, vinyl acetate was subjected to counter-flow contact with ethylene that had evaporated from the polymerization vessel. Therefore, the vinyl acetate having absorbed the ethylene was fed to the polymerization vessel and mixed into a solution in the polymerization vessel. The vinyl acetate having absorbed ethylene exhibited a temperature ($T_1$) of 5° C. Thus, a polymerization solution was obtained continuously at a rate of 39 kg/hr.

At an outlet of the polymerization vessel, a methanol solution of 2,4-diphenyl-4-methyl-1-pentene (DPMP) was added to the polymerization solution taken continuously from the lower part of the polymerization vessel, and non-reacted ethylene was vaporized so as to be removed. The methanol solution of EVA thus obtained flowed continuously through a Raschig-ring-packed removing column from an upper part thereof, while methanol vapor was blown in from the lower part of the column, so that non-reacted vinyl acetate was removed by distillation through the top of the column along with the methanol vapor, and consequently, 35 wt % methanol solution of EVA was obtained. The obtained EVA methanol solution was fed to a saponification reactor, and sodium hydroxide (80 g/L methanol solution) was added thereto so that sodium hydroxide accounted for 0.55 of the equivalent weight with respect to the vinyl acetate component in EVA, and further, methanol was added thereto so that the concentration of EVA was adjusted to 15 wt %. The solution was heated to 60° C., and was subjected to reaction for 5 hours while nitrogen gas was blown into the reactor. Thereafter, the reaction was stopped by neutralization with acetic acid, and the contents were taken out of the reactor, and left at ordinary temperature so that solid substances were deposited in the form of particles. The particles thus deposited were drained by a centrifugal separator, and further, a process of adding a massive amount of water thereto and dewatering the same was applied repeatedly.

The obtained particles were treated with an aqueous solution containing acetic acid and orthoboric acid (OBA) (0.5 g of acetic acid and 0.4 g of orthoboric acid dissolved in 1 L of the aqueous solution) at a bath ratio of 20. Then, after drying, the particles were pelletized by an extruder set at 215° C. EVOH pellets thus obtained were treated with chloroform by means of a Soxhlet extractor for 48 hours so that additives and the like in the EVOH were extracted and removed. Thus, the EVOH pellets were purified. The composition of the purified EVOH was determined by nuclear magnetic resonance (NMR), and it was found that the content of ethylene was 31 mol % and the degree of saponification was 99.5%. Further, the melting point thereof was determined by means of a differential scanning calorimeter (DSC) to be 185° C. Furthermore, at 190° C. and under a load of 2160g, an MFR of 1.5 g/10 min was obtained.

The content of DPMP in an extracted liquid obtained by the Soxhlet extraction was quantified by the aforementioned method, and it was found to be 180 ppm in terms of the content in the EVOH pellet. Furthermore, the content of orthoboric acid in the EVOH pellet was quantified by the aforementioned method, and it was found to be 230 ppm in terms of the element boron.

A single-layer EVOH film with a thickness of 20 $\mu$m was formed using the EVOH pellets and evaluated by the method described in the above section on evaluation methods. The film formation temperature was 220° C. The results of analysis and evaluation are shown in Table 1.

Example 2

By the method described in the above section on evaluation methods, a film was formed by coextrusion having five layers of three kinds, which were external layers on both surfaces made of linear low-density polyethylene (density: 0.92 g/cm$^3$, MFR: 1.5 g/10 min (190° C., 2160 g)), an intermediate layer made of EVOH obtained in Example 1, and adhesive layers provided between the external layers and the intermediate layer and made of maleic anhydride graft-modified linear low-density polyethylene (maleic-anhydride-modified amount: 0.5 wt %, density: 0.91 g/cm$^3$, MFR: 1.5 g/10 min (190° C., 2160g)) (respective layer thicknesses: 20 $\mu$m/ 10 $\mu$m/ 15 $\mu$m/ 10 $\mu$m/ 20 $\mu$m, total thickness: 75 $\mu$m). The extrusion temperature was 220° C. for all the resins. The results of evaluation are shown in Table 1.

Example 3

An EVOH pellet was produced and analyzed, and an EVOH single-layer film was formed and evaluated, in the same manner as that in Example 1 except that DPMP added in Example 1 was not added in the present example. The results of analysis and evaluation are shown in Table 1.

Example 4

A film was formed by coextrusion in the same manner as that in Example 2 except that EVOH used in Example 2 was changed to that obtained in Example 3. The results of evaluation are shown in Table 1.

Example 5

An EVOH pellet was produced and analyzed, and an EVOH single-layer film was formed and evaluated, in the same manner as that in Example 1 except that the treatment with orthoboric acid carried out in Example 1 was omitted in the present example. The results of analysis and evaluation are shown in Table 1.

Example 6

A film was formed by coextrusion in the same manner as that in Example 2 except that EVOH in Example 2 was changed to that obtained in Example 5. The results of evaluation are shown in Table 1.

Example 7

An EVOH pellet was produced and analyzed, and an EVOH single-layer film was formed and evaluated, in the same manner as that in Example 1 except that the polymerization initiator used in Example 1 was changed to di-n-propyl peroxydicarbonate (NPP) in the present example. The results of analysis and evaluation are shown in Table 1.

Example 8

A cylindrical blow molded product having an outer diameter of 70 mm$\phi$, a body-part thickness of 700 $\mu$m, and a capacity of 1000 ml, made of five layers of three kinds, was formed by providing polypropylene ("B200" produced by Mitsui Petrochemical) as outermost and innermost layers, EVOH obtained in Example 7 as an intermediate layer, and maleic anhydride graft-modified polypropylene ("Admer QB550" produced by Mitsui Petrochemical) as adhesive layers between the outermost and innermost layers and the intermediate layer, (respective layer thickness: 250 $\mu$m (outermost layer)/20 $\mu$m/20 $\mu$m/20 $\mu$m/390 $\mu$m (innermost layer), total thickness: 700 $\mu$m), using a direct-blow multilayer blow molding machine (Model TB-ST-6P produced by Suzuki Tekkosho, screw diameters: 45 mm$\phi$, 40 mm$\phi$, 35 mm$\phi$, 35 mm$\phi$), and the obtained molded product was evaluated. The temperature of a die was 220° C., and hot water at 50° C. was circulated around a blow molding die so as to provide gradual cooling conditions. The results of evaluation are shown in Table 1.

Example 9

20000 parts by weight of vinyl acetate containing 20 ppm of acetaldehyde and 350 ppm of ethyl acetate, 2000 parts by weight of ethanol as a polymerization solvent, and 10 parts by weight of acetyl peroxide (APO) as a polymerization initiator were put into a batch-type polymerization vessel equipped with a cooling device and an agitating device, and nitrogen substitution was performed while agitating. Thereafter, ethylene was introduced therein, and the polymerization temperature and the polymerization pressure were adjusted to 75° C. and 60 kg/cm$^2$. Polymerization was promoted with agitation for 5 hours while the foregoing temperature and pressure were maintained.

Subsequently, a polymerization solution was taken out of the lower part of the polymerization vessel. Sorbic acid (SA; 1.5 wt % methanol solution) was added at a ratio of 0.05 wt % with respect to vinyl acetate (10 parts by weight of sorbic acid) at an outlet of the polymerization vessel, and non-reacted ethylene was vaporized so as to be removed. A degree of polymerization was 40% with respect to vinyl acetate charged therein at the initial stage.

The same operations as those conducted after the removal of non-reacted vinyl acetate in Example 1 were carried out, an EVOH pellet was produced and analyzed. An EVOH single-layer film was formed and evaluated. The results of analysis and evaluation are shown in Table 1.

Example 10

A film was formed by coextrusion in the same manner as that in Example 2 except that EVOH used in Example 2 was changed to that obtained in Example 9. The results of evaluation are shown in Table 1.

Example 11

An EVOH pellet was produced and analyzed, and an EVOH single-layer film was formed and evaluated, in the same manner as that in Example 1 except that vinyl acetate used in Example 1 was changed to 95 wt % methanol solution of vinyl acetate (contents of acetaldehyde and methyl acetate were 10 ppm and 500 ppm, respectively, with respect to vinyl acetate) and an amount of methanol (containing substantially no acetaldehyde and saturated acetic ester) directly fed to the polymerization vessel was changed so that a concentration of methanol in the polymerization vessel was equal to that in Example 1. The results of analysis and evaluation are shown in Table 1.

Comparative Example 1

An EVOH pellet was produced and analyzed, and an EVOH single-layer film was formed and evaluated, in the same manner as that in Example 1 except that the contents of acetaldehyde and methyl acetate in vinyl acetate were 250 ppm and 5 ppm, respectively. The results of analysis and evaluation are shown in Table 1.

Comparative Example 2

An EVOH pellet was produced and analyzed, and an EVOH single-layer film was formed and evaluated, in the same manner as that in Example 1 except that the contents of acetaldehyde and methyl acetate in vinyl acetate were 10 ppm and 5 ppm, respectively. The results of analysis and evaluation are shown in Table 1.

Comparative Example 3

An EVOH pellet was produced and analyzed, and an EVOH single-layer film was formed and evaluated, in the same manner as that in Example 1 except that the contents of acetaldehyde and methyl acetate in vinyl acetate were 10 ppm and 2000 ppm, respectively. The results of analysis and evaluation are shown in Table 1.

Comparative Example 4

An EVOH pellet was produced and analyzed, and an EVOH single-layer film was formed and evaluated, in the same manner as that in Example 1 except that a polymerization solvent used in Example 1 was not used herein. The results of analysis and evaluation are shown in Table 1.

Comparative Example 5

An EVOH pellet was produced and analyzed in the same manner as that in Example 1 except that a feeding rate of ethylene was increased in the present example. The content of an ethylene unit in the obtained EVOH was 65 mol %. An EVOH single-layer film was formed and evaluated. The results of analysis and evaluation are shown in Table 1.

TABLE 1

|  |  | EX. 1 | EX. 2 | EX. 3 | EX. 4 | EX. 5 | EX. 6 | EX. 7 | EX. 8 | EX. 9 | EX. 10 |
|---|---|---|---|---|---|---|---|---|---|---|---|
| Vinyl Acetate | Content of Acetaldehyde (ppm) | 10 | 10 | 10 | 10 | 10 | 10 | 10 | 10 | 20 | 20 |
|  | Saturated Acetic Ester Type | Methyl Acetate | Methyl Acetate | Methyl Acetate | Methyl Acetate | Methyl Acetate | Methyl Acetate | Methyl Acetate | Methyl Acetate | Ethyl Acetate | Ethyl Acetate |
|  | Content (ppm) | 500 | 500 | 500 | 500 | 500 | 500 | 500 | 500 | 350 | 350 |
| Solvent |  | M | M | M | M | M | M | M | M | E | E |
| Polymerization Initiator |  | AMV | AMV | AMV | AMV | AMV | AMV | NPP | NPP | APO | APO |
| Polymerization Temperature (° C.) |  | 60 | 60 | 60 | 60 | 60 | 60 | 60 | 60 | 75 | 75 |
| EVOH | Content of Ethylene (mol %) | 31 | 31 | 31 | 31 | 31 | 31 | 31 | 31 | 38 | 38 |
|  | Degree of Saponification (%) | 99.5 | 99.5 | 99.5 | 99.5 | 99.5 | 99.5 | 99.5 | 99.5 | 99.1 | 99.1 |
|  | Stabilizer Type | DPMP | DPMP | — | — | DPMP | DPMP | DPMP | DPMP | SA | SA |
|  | Content (ppm) | 180 | 180 | — | — | 180 | 180 | 180 | 180 | 200 | 200 |
|  | Boron Compound Type | OBA | OBA | OBA | OBA | — | — | OBA | OBA | OBA | OBA |
|  | Content (ppm) | 230 | 230 | 230 | 230 | — | — | 230 | 230 | 230 | 230 |
|  | MFR (g/10 min, 190° C., 2160 g) | 1.5 | 1.5 | 1.5 | 1.5 | 1.9 | 1.9 | 1.5 | 1.5 | 1.8 | 1.8 |
|  | Melting Point | 185 | 185 | 185 | 185 | 185 | 185 | 185 | 185 | 175 | 175 |
| Layer Structure (Single-layer or Multi-layer) |  | Single-Layer | Multi-Layer | Single-Layer | Multi-Layer | Single-Layer | Multi-Layer | Single-Layer | Multi-Layer | Single-Layer | Multi-Layer |
| Form |  | Film | Film | Film | Film | Film | Film | Film | Bottle | Film | Film |
| Results of Evaluation | Melt-Extrusion Stability | A | A | B | B | B | B | A | A | B | B |
| Melt-Moldability | Drawdown Resistance | A | A | A | A | B | A | A | A | B | A |
|  | Neck-in Fluctuation Resistance | B | A | B | A | B | A | B | A | B | A |
|  | Discoloration | A | A | B | B | B | B | A | A | B | B |
|  | Gelation | A | A | B | B | A | A | A | A | B | B |

|  |  |  | EX. 11 | COMP. EX. 1 | COMP. EX. 2 | COMP. EX. 3 | COMP. EX. 4 | COMP. EX. 5 |
|---|---|---|---|---|---|---|---|---|
| Vinyl Acetate | Content of Acetaldehyde (ppm) |  | 10 | 250 | 10 | 10 | 10 | 10 |
|  | Saturated Acetic Ester Type |  | Methyl Acetate | Methyl Acetate | Methyl Acetate | Methyl Acetate | Methyl Acetate | Methyl Acetate |
|  | Content (ppm) |  | 500 | 5 | 5 | 2000 | 500 | 500 |
| Solvent |  |  | M | M | M | M | — | M |
| Polymerization Initiator |  |  | AMV | AMV | AMV | AMV | AMV | AMV |
| Polymerization Temperature (° C.) |  |  | 60 | 60 | 60 | 60 | 60 | 60 |
| EVOH | Content of Ethylene (mol %) |  | 31 | 31 | 31 | 31 | 31 | 65 |
|  | Degree of Saponification (%) |  | 99.5 | 99.5 | 99.5 | 99.5 | 99.5 | 99.5 |

TABLE 1-continued

|  |  |  | | | | | | |
|---|---|---|---|---|---|---|---|---|
|  | Stabilizer | Type | DPMP | DPMP | DPMP | DPMP | DPMP | DPMP |
|  |  | Content (ppm) | 180 | 180 | 180 | 180 | 180 | 180 |
|  | Boron | Type | OBA | OBA | OBA | OBA | OBA | OBA |
|  | Compound | Content (ppm) | 230 | 230 | 230 | 230 | 230 | 230 |
|  | MFR (g/10 min, 190° C., 2160 g) |  | 1.5 | 1.5 | 1.5 | 1.8 | 1.1 | 8.0 |
|  | Melting Point |  | 185 | 185 | 185 | 185 | 185 | 130 |
| Layer Structure (Single-layer or Multi-layer) Form |  |  | Single-Layer Film | Single-Layer Film | Single-Layer Film | Single-Layer Film | Single-Layer Film | Single-Layer Film |
| Results of Evaluation | Melt-Extrusion Stability |  | A | D | C | C | D | B |
|  | Melt-Moldability | Drawdown Resistance | A | D | C | D | B | D |
|  |  | Neck-in Fluctuation Resistance | B | D | C | D | B | D |
|  | Discoloration |  | A | D | C | B | D | B |
|  | Gelation |  | A | D | C | B | D | B |

M: Methanol
AMV: 2,2'-azobis(4-methoxy-2,4-dimethyl valeronitrile)
NPP: di-n-propyl peroxydicarbonate
DPMP: 2,4-diphenyl-4-methyl-1-pentene
OBA: orthoboric acid
E: Ethanol
APO: acetyl peroxide
SA: sorbic acid By saponifying EVA obtained by the method of the present invention, EVOH with improved melt-extrusion stability, improved melt-moldability, and reduced discoloration and gelation, is provided.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for producing an ethylene-vinyl acetate copolymer containing from 5 mol % to 60 mol % ethylene, said method comprising adding a vinyl acetate-containing material, ethylene, a polymerization initiator, a polymerization solvent comprising an aliphatic alcohol having not more than four carbon atoms and a saturated acetic ester to a polymerization vessel and copolymerizing said vinyl acetate and said ethylene at a temperature of from 30°C. to 150° C., wherein the concentration of acetaldehyde added to the polymerization vessel is not more than 200 ppm with respect to the vinyl acetate and the concentration of said saturated acetic ester added to the polymerization vessel is from 10 ppm to 1500 ppm with respect to the vinyl acetate.

2. The method according to claim 1, wherein:
   the vinyl acetate is provided in the form of a vinyl acetate-containing material having a content of acetaldehyde with respect to vinyl acetate of not more than 200 ppm, and a content of saturated acetic ester with respect to vinyl acetate of from 10 ppm to 1500 ppm.

3. The method according to claim 1, wherein:
   the ethylene, the vinyl acetate-containing material, the polymerization initiator, and the polymerization solvent are each supplied continuously to a polymerization vessel; and
   the polymerization solution containing the ethylene-vinyl acetate copolymer is taken out continuously from the polymerization vessel.

4. The method according to claim 3, comprising the steps of:
   (A) introducing the vinyl acetate-containing material into a heat exchanger equipped with cooling means, and introducing ethylene from a polymerization vessel into the heat exchanger, whereby to cause the vinyl acetate-containing material to absorb at least a part of the ethylene in the heat exchanger;
   (B) introducing the vinyl acetate-containing material that has absorbed ethylene into the polymerization vessel which contains a polymerization solution comprising ethylene, vinyl acetate, a polymerization solvent and a polymerization initiator; and
   (C) introducing vaporized ethylene in excess of the ethylene solubility of the polymerization solution into the heat exchanger.

5. The method according to claim 4, wherein a temperature $T_1$ of the vinyl acetate-containing material that has absorbed ethylene and a temperature $T_2$ of the polymerization solution in the polymerization vessel satisfy the relationship $T_1 < T_2$.

6. The method according to claim 4, wherein the heat exchanger is a wetted-wall multi-tubular heat exchanger and the vinyl acetate-containing material is passed in a thin layer form therethrough.

7. The method according to claim 1, wherein:
   the aliphatic alcohol is methanol, ethanol or a mixture thereof; and
   the saturated acetic ester is methyl acetate, ethyl acetate, or a mixture thereof.

8. The method according to claim 1, wherein the polymerization initiator comprises at least one compound selected from a diacylperoxide-based initiator, a valeronitrile-based initiator, and a peroxydicarbonate-based initiator.

9. The method according to claim 1, wherein a compound having a molecular weight of not more than 1000 and comprising a conjugated double bond is added to the solution after polymerization.

10. The method according to claim 1, wherein the vinyl acetate-containing material is vinyl acetate or an aliphatic alcohol solution including vinyl acetate, wherein the aliphatic alcohol has not more than four carbon atoms.

11. A method for producing a saponified ethylene-vinyl acetate copolymer, said method comprising the step of saponifying the ethylene-vinyl acetate copolymer produced by the method according to claim 1.

12. An ethylene-vinyl acetate copolymer obtained by a method as claimed in claim 1.

13. A saponified ethylene-vinyl acetate copolymer obtained by a method as claimed in claim 11.

14. The saponified ethylene-vinyl acetate copolymer according to claim 13, containing a boron compound.

15. A molded product comprising a saponified ethylene-vinyl acetate copolymer according to claim 13.

* * * * *